(12) United States Patent
Qian

(10) Patent No.: US 10,118,235 B2
(45) Date of Patent: Nov. 6, 2018

(54) KNUCKLE DEBURRING CUTTER AND MACHINING METHOD OF KNUCKLE

(71) Applicant: BWI (Shanghai) Co., Ltd., Shanghai (CN)

(72) Inventor: Xiaoye Qian, Shanghai (CN)

(73) Assignee: BWI (Shanghai) Co., Ltd., Shanghai (CN)

(*) Notice: Subject to any disclaimer, the term of this patent is extended or adjusted under 35 U.S.C. 154(b) by 134 days.

(21) Appl. No.: 14/861,074

(22) Filed: Sep. 22, 2015

(65) Prior Publication Data

US 2016/0114411 A1 Apr. 28, 2016

(30) Foreign Application Priority Data

Oct. 22, 2014 (CN) .......................... 2014 1 0566057

(51) Int. Cl.
*B25H 7/04* (2006.01)
*B23B 51/10* (2006.01)
*B23C 5/14* (2006.01)

(52) U.S. Cl.
CPC .............. *B23B 51/101* (2013.01); *B25H 7/04* (2013.01); *B23B 51/105* (2013.01); *B23C 5/14* (2013.01);
(Continued)

(58) Field of Classification Search
CPC .. B24D 5/02; B24D 2203/00; B24D 2205/00; B23C 3/02; B23C 3/023; B23C 3/16;
(Continued)

(56) References Cited

U.S. PATENT DOCUMENTS 1,461,376 A * 7/1923 Bartlett ................ B27G 13/005
144/136.95
3,309,772 A * 3/1967 Lieb .......................... A61C 3/02
433/166
(Continued)

FOREIGN PATENT DOCUMENTS

CN 1209765 A 3/1999
CN 2608196 Y 3/2004
(Continued)

OTHER PUBLICATIONS

The State Intellecutal Property Office of China, Second Office Action, dated Dec. 5, 2016, Seven (7) Pages.
(Continued)

*Primary Examiner* — Daniel Howell
*Assistant Examiner* — Yasir Diab
(74) *Attorney, Agent, or Firm* — William H. Honaker; Dickinson Wright PLLC

(57) ABSTRACT

A knuckle deburring cutter and a method of knuckle for removal of burrs at a lower ball head hole of a knuckle and burrs in the locations where the lower ball head hole, a pinch bolt hole and a pinch bolt slot intersect one another. The knuckle deburring cutter includes a cutter shank in a circular bar shape having a diameter less than that of the lower ball head hole. A deburring cutter head is positioned at an end of the cutter shank with the shape of the deburring cutter head matching that of the pinch bolt hole. A sharp-angle part of lettering is positioned at an end of the deburring cutter head with a width of the sharp-angle of lettering being less than that of the pinch bolt slot. The knuckle deburring cutter and associated method provides benefits, such as low rejection rate, ease of machining, short production rhythm and the like.

5 Claims, 2 Drawing Sheets

(52) U.S. Cl.
CPC ...... *B23C 2220/20* (2013.01); *B24D 2205/00* (2013.01)

(58) Field of Classification Search
CPC .... B23C 3/28; B23C 5/10; B23C 5/14; B23C 5/12; B23C 2210/242; B23C 2220/20; B25H 7/04; B23B 51/101; B23B 51/105
USPC .......................................................... 451/541
See application file for complete search history.

(56) References Cited

U.S. PATENT DOCUMENTS

| | | | | |
|---|---|---|---|---|
| 3,550,229 A * | 12/1970 | Zenses | ................ | B23B 51/0406 144/23 |
| 4,470,733 A * | 9/1984 | Marques, Jr. | ........... | B23B 51/02 144/240 |
| 4,720,218 A * | 1/1988 | DeFries | .................. | B23B 51/00 407/1 |
| 4,753,558 A * | 6/1988 | Jansson | .................. | B27G 15/00 144/219 |
| 5,271,135 A * | 12/1993 | Shifferly | ............... | B23B 51/101 407/29.1 |
| 5,345,155 A * | 9/1994 | Masaki | ............... | B60L 11/1803 318/400.07 |
| 7,736,101 B2 * | 6/2010 | Dubell | ...................... | B23C 3/12 409/140 |
| 2005/0019123 A1 * | 1/2005 | Lawson | .................. | B23B 31/08 409/140 |
| 2009/0136308 A1 * | 5/2009 | Newitt | ...................... | B23C 5/10 408/145 |
| 2010/0266984 A1 * | 10/2010 | Jung | .................. | A61B 17/1688 433/166 |
| 2011/0038679 A1 * | 2/2011 | Kozak | ..................... | B23B 35/00 408/1 BD |

FOREIGN PATENT DOCUMENTS

| | | | | |
|---|---|---|---|---|
| CN | 201275649 Y | 7/2009 | | |
| CN | 202225654 U | 5/2012 | | |
| CN | 202894680 U | 4/2013 | | |
| CN | 103522140 A | 1/2014 | | |
| DE | 3732773 A1 * | 4/1989 | ............... | B23C 3/00 |
| JP | 2008302445 A | 12/2008 | | |
| WO | 9843770 A1 | 10/1998 | | |

OTHER PUBLICATIONS

The State Intellectual Property Office of China, First Office Action and Search Report, dated Apr. 14, 2016, 11 Pages.

* cited by examiner

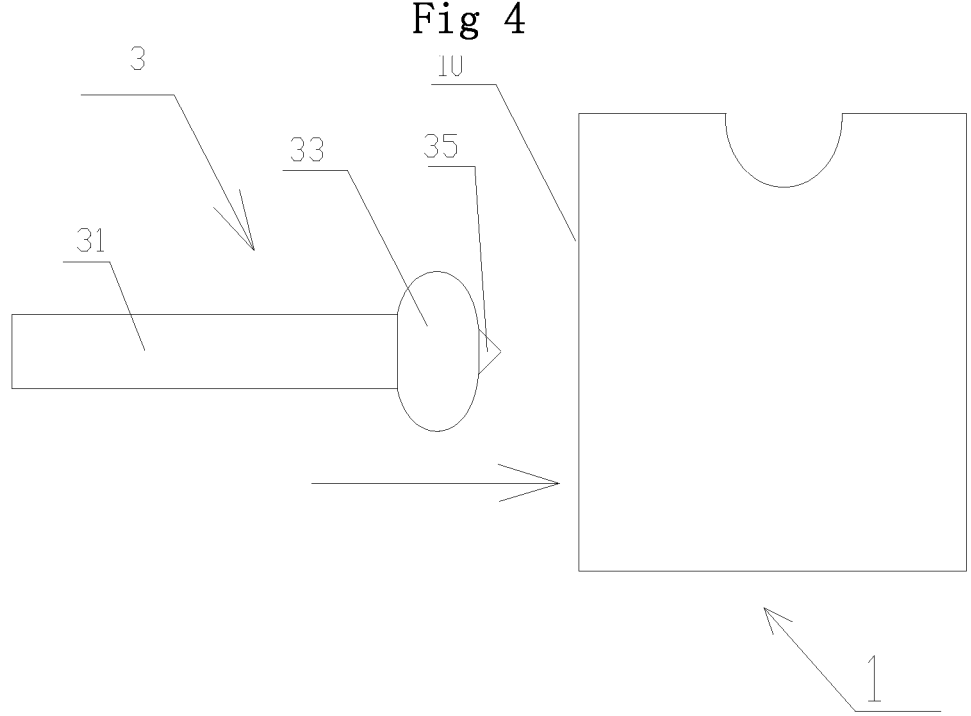

KNUCKLE DEBURRING CUTTER AND MACHINING METHOD OF KNUCKLE

CROSS-REFERENCE TO RELATED APPLICATION

This application claims the benefit and priority of Chinese patent application Serial No. 201410566057.8, filed Oct. 22, 2014, the entire disclosure of which is incorporated herein by reference.

FIELD OF THE INVENTION

The present invention relates to a knuckle deburring cutter and machining method of knuckle.

BACKGROUND OF THE INVENTION

At present, an automobile knuckle has a problem of burrs at a pinch bolt hole, a normal tool can't remove them clearly and a bolt can't pass the hole smoothly. Thus, deburring needs to be performed by hand after machining of the knuckle, which results in waste of labor and the quality of the deburring can not be effectively under control.

SUMMARY OF THE INVENTION

The present invention provides a knuckle deburring cutter and machining method of knuckle to solve the problem of manual deburring required for a knuckle, waste of labor, inefficiency.

Accordingly, the present invention provides a knuckle deburring cutter for removal of burrs at a lower ball head hole of a knuckle and burrs in the locations where the lower ball head hole, a pinch bolt hole and a pinch bolt slot intersect one another, the knuckle comprises the lower ball head hole, the pinch bolt hole and the pinch bolt slot in communication with one another; wherein the lower ball head hole runs through a front end face and a rear end face of the knuckle; the pinch bolt slot is an open slot, provided at a top surface of the knuckle, and extends to the rear end face of the knuckle from the front end face of the knuckle; the pinch bolt hole is positioned between the front end face and rear end face of the knuckle, the knuckle deburring cutter comprising:

a cutter shank in a circular shank shape, a diameter of the cutter shank is less than that of the lower ball head hole;

a deburring cutter head positioned at an end of the cutter shank, the shape of the deburring cutter head matches that of the pinch bolt hole;

a sharp-angle of lettering positioned at an end of the deburring cutter head, a width of the sharp-angle of lettering is less than that of the pinch bolt slot.

Further, a surface of the deburring cutter head is a smooth curved surface that matches the shape of the pinch bolt hole.

Further, a caliber of the deburring cutter head is greater than a diameter of the cutter shank.

Further, the deburring cutter head is in a spherical shape.

The present invention further provides a machining method of knuckle comprising a step A: using the deburring cutter head of the knuckle deburring cutter and extending it into the lower ball head hole of the knuckle to remove burrs in the locations where the lower ball head hole of the knuckle, the pinch bolt hole and the pinch bolt slot intersect one another.

Further, the machining method of knuckle further comprising a step B: using the sharp-angle of lettering of the knuckle deburring cutter to letter a date code on the knuckle.

Further, the step B occurs after the step A.

The knuckle deburring cutter of the present invention has a deburring cutter head that matches the shape of the pinch bolt hole, the deburring cutter head is similar to or resembles the pinch bolt hole, it is thus able to machine the deburring cutter, the profile modeling tool used in the present invention takes less time than the normal tool, it can deburr clearly and save labor in deburring after machining.

Furthermore, since two tasks of lettering date code and deburring are completed by one cutter, it saves CT or process for machining one cutter.

The present invention provides benefits, such as low rejection rate, ease of machining, short production rhythm and the like.

BRIEF DESCRIPTION OF THE DRAWINGS

FIG. 4 illustrates the operation principle based on which the knuckle deburring cutter of the present invention letters a date code.

DETAILED DESCRIPTION OF THE INVENTION

In order to more clearly understand the technical feature, object and effect of the present invention, now the present invention will be described with reference to the drawings.

Figure 1:
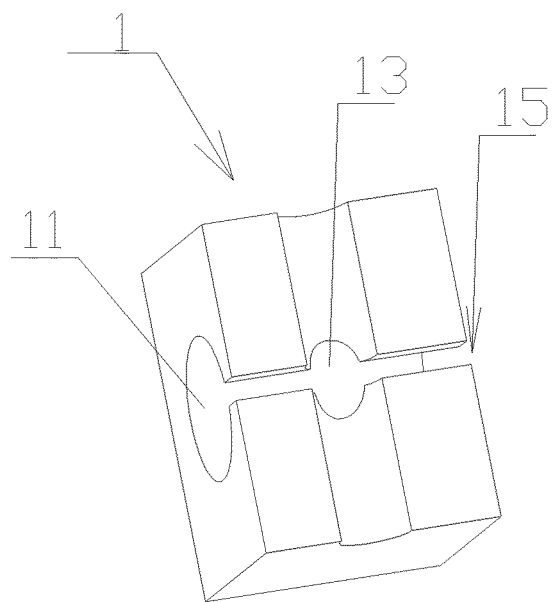
FIG. 1 is a perspective view of a knuckle.

As shown in FIG. 1, an automobile knuckle comprises a lower ball head hole, a pinch bolt hole, a pinch bolt slot and has known in the prior art, and its structure is for example, the lower ball head hole, the pinch bolt hole and the pinch bolt slot are disposed on the knuckle of which the main body is a block in a rectangular parallelepiped shape. The lower ball head hole 11 runs through a front end face and a rear end face of the knuckle and is positioned at a certain distance from the top surface, and a date code can be machined on the front end face. The pinch bolt slot 15 is an open slot, provided on the top surface of the knuckle, extends to the rear end face of the knuckle from the front end face of knuckle. The pinch bolt hole 13 is positioned between the front and rear end faces of the knuckle, and the lower ball head hole 11, the pinch bolt hole 13 and the pinch bolt slot 15 are in communication with one another. Viewed from a side view direction, the lower ball head hole 11 is in a circular shape, and viewed from a overhead view direction, the pinch bolt hole 13 is a circular-shape hole, and the pinch bolt slot 15 is a straight slot. The axis of the lower ball head hole 11 is perpendicular to that of the pinch bolt hole 13, and the axis of the lower ball head hole 11 is consistent or parallel with the length direction of the pinch bolt slot 15.

Figure 2:
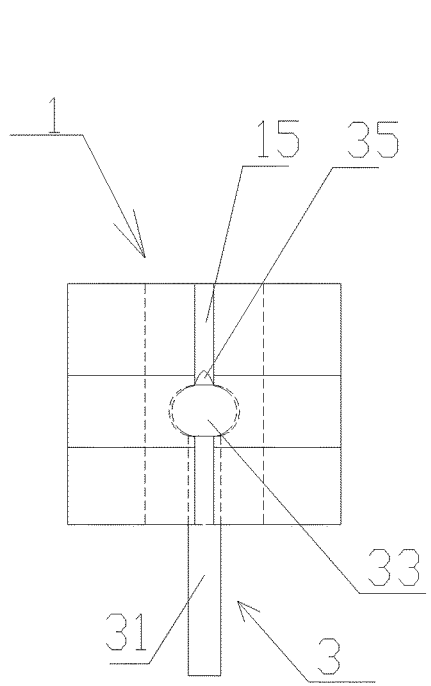
FIG. 2 illustrates the operation principle based on which the knuckle deburring cutter of the present invention removes burrs in a top view.
Figure 3:
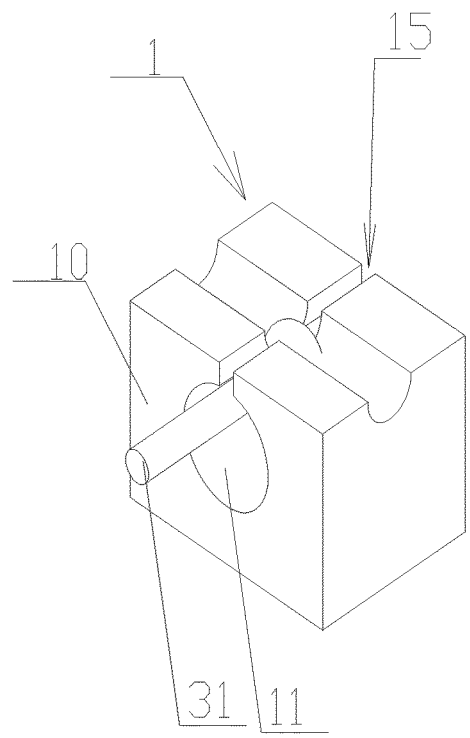
FIG. 3 illustrates the operation principle based on which the knuckle deburring cutter of the present invention removes burrs in a perspective view.

Burrs in the locations where the lower ball head hole 11, the pinch bolt hole 13 and the pinch bolt slot 15 intersect one another need to be removed, as shown in FIGS. 2, 3 and 4, the present invention provides a knuckle deburring cutter 3 for removal of burrs at the lower ball head hole of the knuckle and burrs in the locations where the lower ball head hole, the pinch bolt hole and the pinch bolt slot intersect one another. The knuckle deburring cutter 3 comprises:

a cutter shank 31 in a circular shank shape, a diameter of the cutter shank 31 is less than that of the lower ball head hole 11;

a deburring cutter head 33 positioned at an end of the cutter shank 31, the shape of the deburring cutter head 33 matches that of the pinch bolt hole 13; the deburring cutter head is similar to or resembles the pinch bolt hole and can access the hole, it is thus able to machine the deburring cutter, the profile modeling tool used in the present invention takes less time than the normal tool, it can deburr clearly and save labors of deburring after machining;

a sharp-angle of lettering 35 for lettering a date code, positioned at an end of the deburring cutter head 33, a width of the sharp-angle of lettering is less than that of the pinch bolt slot 15, so that the sharp-angle of lettering 35 can come out of the opening of the pinch bolt slot 15. Two tasks of lettering date code and deburring are completed by one cutter, which saves production rhythm for machining one cutter.

Further, as shown in FIGS. 2 and 4, a surface of the deburring cutter head 33 is a smooth curved surface that matches the shape of the pinch bolt hole 33. Thus, it is preferably possible to accomplish the effect of deburring. For example, the deburring cutter head is in a spherical or ellipsoidal shape, which has a preferable effect of deburring.

Further, a caliber of the deburring cutter head 33 is greater than a diameter of the cutter shank 31, so that the cutter shank 31 can conveniently access the lower ball head hole 11.

The present invention further provides a machining method of knuckle comprising:

a step A: using the deburring cutter head 33 of the knuckle deburring cutter and extending it into the lower ball head hole of the knuckle to remove burrs in the locations where the lower ball head hole, the pinch bolt hole and the pinch bolt slot intersect one another by machining (such as polishing). The knuckle deburring cutter has a deburring cutter head that matches the shape of the pinch bolt hole, the cutter shank 31 can enter and exit the knuckle from the lower ball head hole, the deburring cutter head is similar to or resembles the pinch bolt hole, it is thus able to machine (such as polishing) the deburring cutter, the profile modeling tool used in the present invention takes less time than the normal tool, it can deburr clearly and save labors of deburring after machining.

Further, the machining method of knuckle further comprises a step B: using the sharp-angle of lettering 35 of the knuckle deburring cutter to letter a date code on the knuckle, e.g., on the front end face 10 of the knuckle, also on other surfaces among the outside surfaces of the knuckle. The present invention can firstly remove burrs with the knuckle deburring cutter, and then the knuckle deburring cutter exits via the lower ball head hole followed by lettering a date code. Since two tasks of lettering date code and deburring are completed by one cutter, it saves production rhythm or procedure for machining one cutter.

Further, the step B occurs after the step A. Such a machining sequence satisfies the production sequence.

The foregoing is only an illustrative embodiment of the present invention but not intended to limit the scope of the present invention. Each part of the present invention can be combined with each other without conflict; all of the equivalent variations and amendments made by any person skilled in the art shall fall within the scope of protection of the present invention without departing from the concept and principle of the present invention.

The invention claimed is:

1. A knuckle deburring cutter for removal of burrs of a knuckle having a lower ball head hole and, a pinch bolt hole and a pinch bolt slot in communication with one another, said knuckle deburring cutter comprising:
    a cutter shank having a cylindrical shape and defining a diameter being less than that of the lower ball head hole of the knuckle;
    a deburring cutter head disposed at an end of the cutter shank and having a spherical or ellipsoidal shape matching that of the pinch bolt hole of the knuckle; and
    a sharp-angle of lettering extending outwardly from an end of the deburring cutter head defining a width being less than that of the pinch bolt slot of the knuckle, whereby a maximum width of the sharp-angle of lettering is less than a minimum diameter of the deburring cutter head, and
    wherein a surface of the deburring cutter head is a smooth curved surface that matches the shape of the pinch bolt hole.

2. The knuckle deburring cutter as claim 1, wherein a caliber of the deburring cutter head is greater than a diameter of the cutter shank.

3. A machining method of knuckle comprising:
    a step (A) using the deburring cutter head of the knuckle deburring cutter as claim 1 and extending it into the lower ball head hole of the knuckle to remove burrs at the lower ball head hole of the knuckle and burrs in the locations where the lower ball head hole, the pinch bolt hole and the pinch bolt slot intersect one another by machining.

4. The machining method of knuckle as claim 3, further comprising a step (B) using the sharp-angle of lettering of the knuckle deburring cutter as claim 1 to letter a date code on the knuckle.

5. The machining method of knuckle as claim 4, wherein the step (B) occurs after the step (A), and the step (B) occurs after the knuckle deburring cutter exits the lower ball head hole, the pinch bolt hole and the pinch bolt slot.

* * * * *